US011924938B2

(12) United States Patent
Yamazaki et al.

(10) Patent No.: US 11,924,938 B2
(45) Date of Patent: Mar. 5, 2024

(54) ILLUMINATOR

(71) Applicant: MITUTOYO CORPORATION, Kanagawa (JP)

(72) Inventors: Tadashi Yamazaki, Kanagawa (JP); Yuto Konno, Kanagawa (JP); Hideki Morita, Miyazaki (JP); Nobuya Kaneko, Kanagawa (JP); Satoru Hirasawa, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 17/839,091

(22) Filed: Jun. 13, 2022

(65) Prior Publication Data

US 2022/0400543 A1 Dec. 15, 2022

(30) Foreign Application Priority Data

Jun. 14, 2021 (JP) ................................ 2021-098462

(51) Int. Cl.
*H05B 45/34* (2020.01)
*H05B 45/18* (2020.01)
*H05B 45/56* (2020.01)

(52) U.S. Cl.
CPC ............ *H05B 45/34* (2020.01); *H05B 45/18* (2020.01); *H05B 45/56* (2020.01)

(58) Field of Classification Search
CPC ........ H05B 45/18; H05B 45/28; H05B 45/34; H05B 45/56; H05B 45/345; H05B 45/355; H05B 47/105; H05B 47/135; H05B 47/155
See application file for complete search history.

(56) References Cited

U.S. PATENT DOCUMENTS 8,344,652 B2 1/2013 Ochi et al.
8,890,443 B2 * 11/2014 Kang .................... H05B 47/28 315/297
2006/0022616 A1 * 2/2006 Furukawa ............. G09G 3/342 315/309
2007/0176885 A1 * 8/2007 Jun ..................... G09G 3/3426 345/102
2011/0084608 A1 * 4/2011 Lin ......................... B60Q 3/43 362/520
2011/0109655 A1 5/2011 Takeda
(Continued)

FOREIGN PATENT DOCUMENTS

JP 2010-175399 A 8/2010
WO 2011/065047 A1 6/2011

*Primary Examiner* — Tung X Le
(74) *Attorney, Agent, or Firm* — Greenblum & Bernstein, P.L.C.

(57) ABSTRACT

An illuminator includes: a light emitter including a light-emitting diode; a temperature sensor configured to detect a current temperature of the light emitter; and an illumination controller configured to adjust a drive voltage being supplied to the light emitter in accordance with the current temperature. The illumination controller includes a reference temperature storage in which a reference temperature is stored in advance and is configured to adjust the drive voltage by detecting the current temperature from the temperature sensor on a constant time cycle and comparing the current temperature with the reference temperature.

3 Claims, 6 Drawing Sheets

(56) References Cited

U.S. PATENT DOCUMENTS

| | | | | |
|---|---|---|---|---|
| 2011/0291578 | A1* | 12/2011 | Philippbar | H05B 45/18 315/224 |
| 2012/0248998 | A1* | 10/2012 | Yoshinaga | H05B 45/3725 315/193 |
| 2013/0002167 | A1* | 1/2013 | Van De Ven | F21V 3/12 315/297 |
| 2013/0033198 | A1* | 2/2013 | Kang | H05B 45/38 315/309 |
| 2013/0127356 | A1 | 5/2013 | Tanaka et al. | |
| 2013/0293147 | A1* | 11/2013 | Rogers | H05B 45/20 315/297 |
| 2014/0354188 | A1* | 12/2014 | Takahashi | H05B 47/175 315/312 |
| 2017/0031278 | A1* | 2/2017 | Yada | G03G 15/2039 |
| 2020/0318825 | A1 | 10/2020 | Jiang et al. | |
| 2020/0389954 | A1 | 12/2020 | Sinphay et al. | |

* cited by examiner

ILLUMINATOR

The entire disclosure of Japanese Patent Application No. 2021-098462 filed Jun. 14, 2021 is expressly incorporated by reference herein.

TECHNICAL FIELD

The present invention relates to an illuminator for a measurement device.

BACKGROUND ART

For a vision measuring system or a device that measures a profile or the like by an optical unit, an illuminator that illuminates a measurement target is usable. An illuminator including a light-emitting diode (LED) as a light source is frequently used (see Patent Literature 1: JP 2010-175399 A).

In an LED illuminator, a constant voltage control circuit or a constant current control circuit is used as an LED driver circuit to keep a brightness of illumination constant, thus maintaining an emission state of an LED, or illuminance as an illuminator, at a constant level (see Patent Literature 2: WO 2011-065047).

In the above-described constant voltage control circuit, a voltage being applied to the LED is stabilized by a voltage feedback control. However, a forward voltage in the LED would fluctuate due to heat generation of the LED during illumination or the like, causing a fluctuation in forward current and, consequently, a fluctuation in brightness (luminosity) of the LED.

SUMMARY OF THE INVENTION

An object of the invention is to provide an illuminator capable of stabilizing an illuminance with a simplified configuration.

An illuminator according to an aspect of the invention includes: a light emitter including a light-emitting diode; a temperature sensor configured to detect a current temperature of the light emitter; and an illumination controller configured to adjust a drive voltage being supplied to the light emitter in accordance with the current temperature.

In such an aspect of the invention, the drive voltage being supplied from the illumination controller to the light emitter is adjusted on the basis of the current temperature of the light emitter detected by the temperature sensor. This stabilizes the current flowing through the light emitter irrespective of a change in temperature of the light emitter to stabilize the brightness of the light emitter.

In other words, in causing the light-emitting diode (LED) to emit light, a forward current $If=(E-Vf)/R$, where E denotes the drive voltage, R denotes a limiting resistance, and Vf denotes a forward voltage of the LED. The LED generates heat while being lit and properties thereof undergo a change with a rise in temperature, which results in a lowering of the forward voltage Vf. With the forward voltage Vf of the LED lowered, the forward current If increases and the brightness also increases as long as the drive voltage E and the limiting resistance R are fixed. In contrast, the drive voltage E is reduced on the basis of the current temperature of the LED, thereby performing adjustment in accordance with the lowering of the forward voltage Vf due to a rise in temperature. As a result, the forward current If can be stabilized to maintain the brightness of the LED at a constant level.

Such a temperature-based current stabilization control can be easily achieved by adding the temperature sensor and changing control software.

Therefore, according to the aspect of the invention, the brightness of the light emitter is stabilized by temperature feedback, which makes it possible to stabilize the illuminance of the illuminator with a simplified structure.

In the illuminator of the aspect of the invention, it is preferable that the illumination controller have a reference temperature stored therein in advance, the illumination controller being configured to compare the current temperature and the reference temperature to adjust the drive voltage.

By virtue of such a configuration of the aspect of the invention, the drive voltage can be easily adjusted in accordance with the current temperature of the light emitter by the comparison with the reference temperature stored in advance; therefore, the illuminance of the illuminator can be stabilized with a simplified structure.

The current temperature detected by the temperature sensor when the illuminator is activated may be set as the reference temperature, or room temperature or any other temperature may be designated. Regarding the reference temperature, a default value may be left unchanged or the reference temperature may be updated with the current temperature every time when the drive voltage is adjusted.

In comparing the current temperature and the reference temperature, upper and lower ranges may be provided with respect to the reference temperature.

In the illuminator of the aspect of the invention, it is preferable that the illumination controller be configured to detect the current temperature from the temperature sensor on a constant time cycle and adjust the drive voltage.

By virtue of such a configuration of the aspect of the invention, an excessively frequent adjustment operation can be avoided by performing the process on the constant time cycle; therefore, it is possible to keep pace with a change in temperature of the light emitter with a load of the process being reduced.

In the illuminator of the aspect of the invention, it is preferable that the temperature sensor be attached to a heat sink fixed to the light emitter or a circuit board to which the light emitter is fixed.

By virtue of such a configuration of the aspect of the invention, the current temperature of each light emitter can be detected. In particular, in a case where the temperature sensor is attached to the circuit board, temperatures of a plurality of light emitters arranged on the circuit board can be comprehensively detected.

According to the aspect of the invention, it is possible to provide an illuminator capable of stabilizing an illuminance with a simplified configuration.

DESCRIPTION OF EMBODIMENT(S)

Description will be made below on an exemplary embodiment of the invention on the basis of the drawings.

Figure 1:
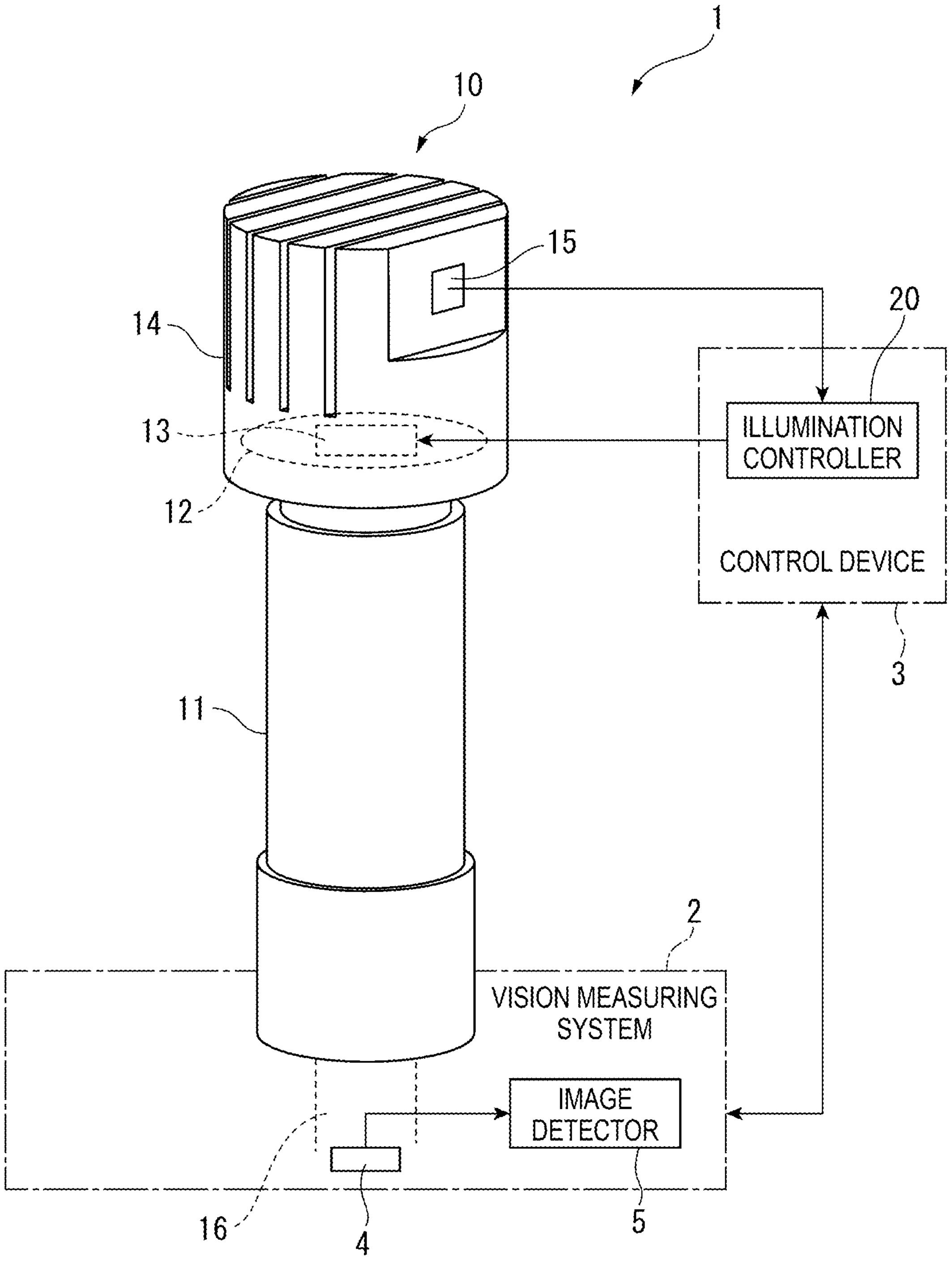
FIG. 1 is a schematic diagram illustrating an exemplary embodiment of the invention.
Figure 2:
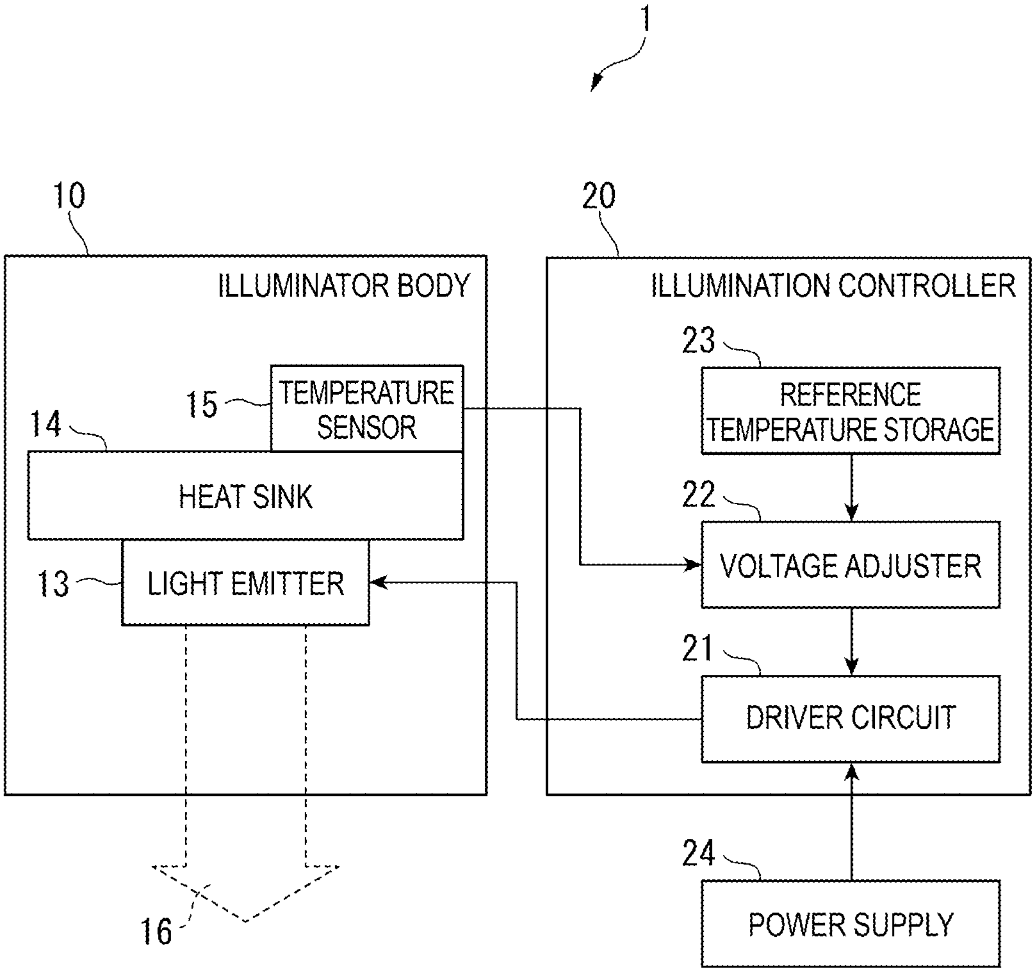
FIG. 2 is a block diagram illustrating a control block of the exemplary embodiment.

FIG. 1 and FIG. 2 each illustrate an illuminator 1 of the exemplary embodiment.

The illuminator 1, which is an illuminator for white-light epi-illumination attachable to a vision measuring system 2, includes an equipment body 10 attachable to the vision measuring system 2 and an illumination controller 20 installable in a control device 3 of the vision measuring system 2.

In FIG. 1, the equipment body 10 includes a case 11 attachable to the vision measuring system 2, a circuit board 12 fixed to an upper end of the case 11, and a light emitter 13 including, as a light source, a light-emitting diode (LED) fixed to the circuit board 12.

The light emitter 13 is driven by the illumination controller 20, which is installed in the control device 3, supplying illumination light 16 for epi-illumination to the vision measuring system 2.

In the vision measuring system 2, an image of a workpiece 4 illuminated with the illumination light 16 is detected by an image detector 5, being forwarded to the control device 3 and processed.

The equipment body 10 further includes a heat sink 14 that air-cools the light emitter 13 using a number of fins and a temperature sensor 15 fixed to the heat sink 14.

The temperature sensor 15 detects a current temperature of the light emitter 13 through the heat sink 14 and the detected temperature is read by the illumination controller 20.

The illumination controller 20 controls a drive state of the light emitter 13 on the basis of the current temperature of the light emitter 13 detected by the temperature sensor 15.

In FIG. 2, the illumination controller 20 includes a driver circuit 21 that drives the light emitter 13, a voltage adjuster 22 that adjusts a drive voltage of the driver circuit 21, and a reference temperature storage 23 that stores a reference temperature that serves as a reference for voltage adjustment. The driver circuit 21 is connected to a power supply 24 that supplies an electric power for driving the light emitter 13.

Figure 3:
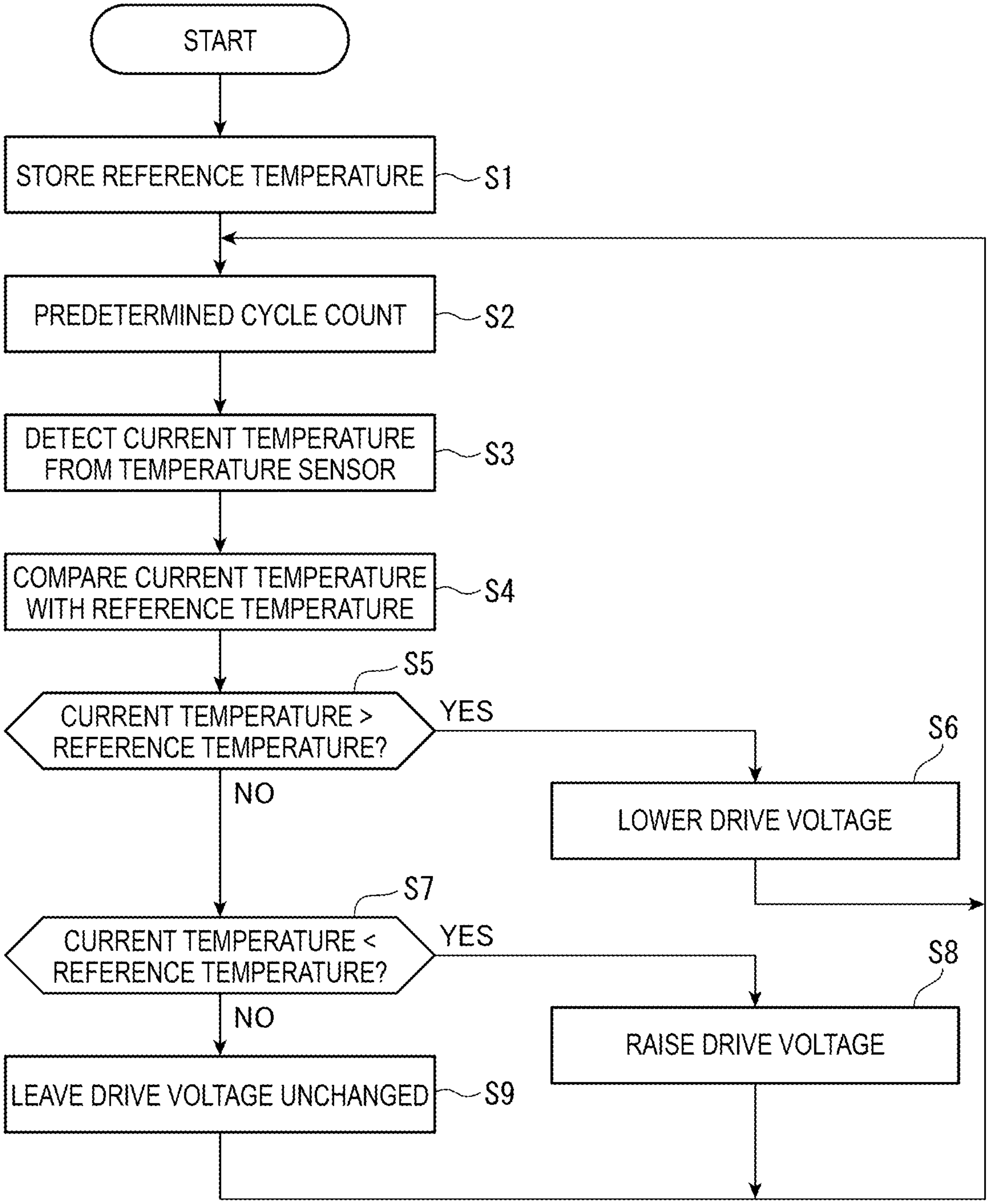
FIG. 3 is a flowchart illustrating an operation of the exemplary embodiment.

FIG. 3 illustrates a drive control for the light emitter 13 to be performed by the illumination controller 20.

The illumination controller 20 starts operating at the same time when the illuminator 1 is activated, detecting the current temperature from the temperature sensor 15 and causing the reference temperature storage 23 to store it (Step S1 in FIG. 3) and causing the voltage adjuster 22 to start voltage adjustment.

The voltage adjuster 22 counts a predetermined cycle (for instance, 10 minutes) (Step S2), detects the current temperature from the temperature sensor 15 after the elapse of the predetermined cycle (Step S3), and compares it with the reference temperature stored in the reference temperature storage 23 (Step S4).

In response to the current temperature being higher than the reference temperature (Step S5), the voltage adjuster 22 lowers the drive voltage of the driver circuit 21 (Step S6).

In response to the current temperature being lower than the reference temperature (Step S7), the voltage adjuster 22 raises the drive voltage of the driver circuit 21 (Step S8).

In response to the current temperature being equal to the reference temperature, the voltage adjustment is not performed and the current drive voltage is left unchanged (Step S9).

It should be noted that regarding the determinations in Steps S5 and S7, with an upper-limit value and a lower-limit value being set in advance with a predetermined width relative to the reference temperature therebetween, the voltage adjustment may be determined not to be performed as long as the current temperature falls within a temperature width corresponding to the predetermined width therebetween.

In addition, a voltage adjustment amount may be set at a predesignated value (for instance, 50 mV) or ratio (5%) or, alternatively, the adjustment amount may be increased/reduced in accordance with an extent of a difference between the reference temperature and the current temperature.

By virtue of the illumination controller 20 performing the above-described drive control, brightness of light emission of the light emitter 13 is maintained at a constant level.

Figure 4:
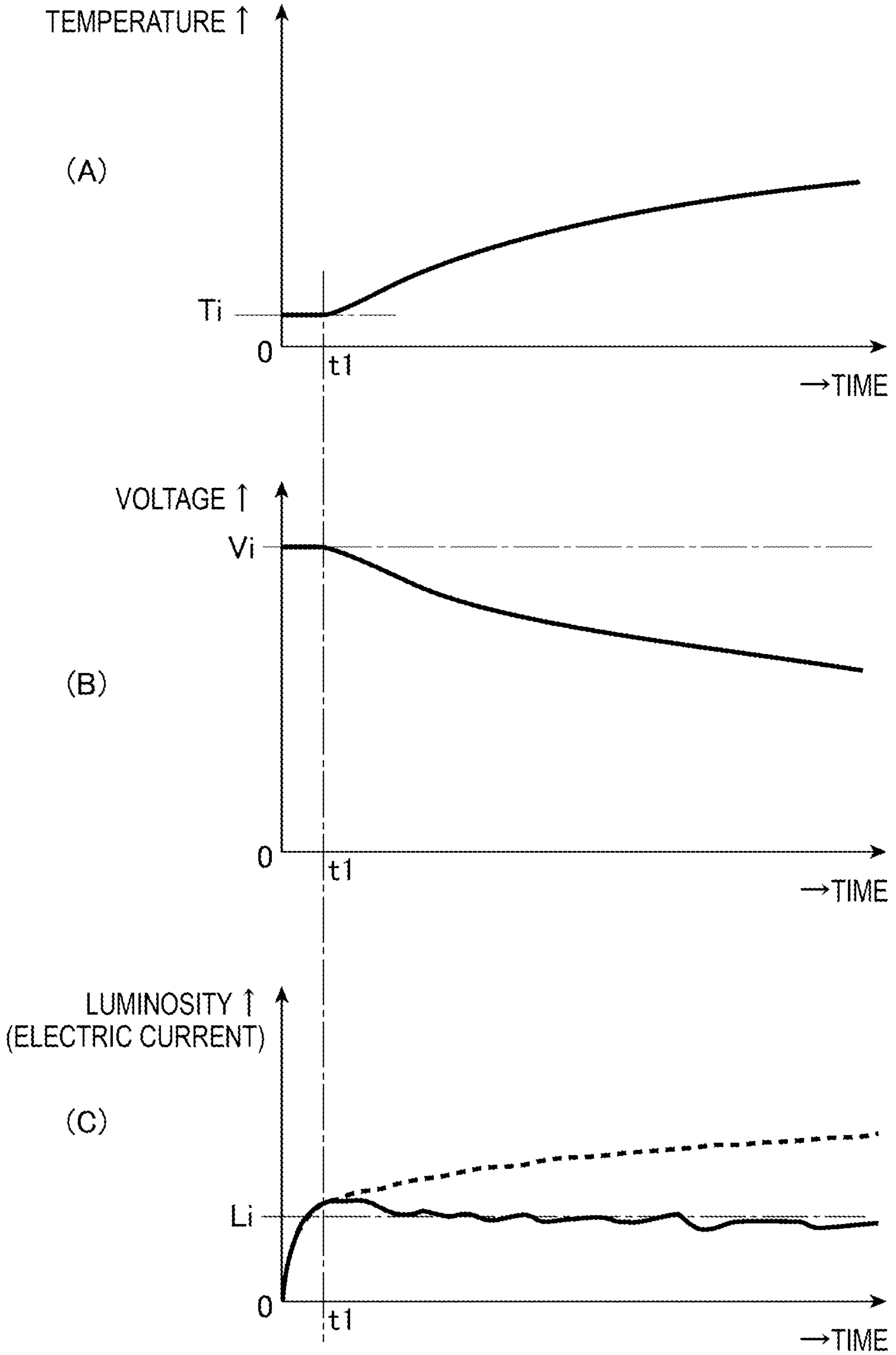
FIG. 4 is a graph illustrating workings of the exemplary embodiment.

As illustrated in FIG. 4(A), the temperature of the light emitter 13 (the current temperature detectable by the temperature sensor 15), which is a temperature Ti at the start of operation, starts rising at a time t1 after a predetermined time delay.

As illustrated in FIG. 4(B), the drive voltage supplied to the light emitter 13 from the driver circuit 21 is a voltage Vi at the start of operation. However, the drive voltage is lowered through the voltage adjustment (Steps S4 to S6) by the voltage adjuster 22 in a case where the current temperature of the light emitter 13 keeps rising.

The light-emitting diode (LED) of the light emitter 13 satisfies a forward current $If=(E-Vf)/R$, where E denotes the drive voltage, R denotes a limiting resistance R, and Vf denotes a forward voltage of the LED. The LED generates heat while being lit and properties thereof undergo a change with a rise in temperature, which results in a lowering of the forward voltage Vf. With the forward voltage Vf of the LED lowered, the forward current If increases and the brightness also increases as long as the drive voltage E and the limiting resistance R are fixed.

In contrast, the drive voltage E is reduced on the basis of the current temperature by the voltage adjustment by the voltage adjuster 22, thereby performing adjustment in accordance with the lowering of the forward voltage Vf due to a rise in temperature.

By virtue of such a voltage adjustment by the voltage adjuster 22, the forward current If of the LED of the light emitter 13 is stabilized to maintain the brightness of the LED at a constant level.

In FIG. 4(C), in a case where the voltage adjustment by voltage adjuster 22 is not performed, a luminosity of the light emitter 13 is as represented by a chain line; the forward current If of the LED of the light emitter 13 increases in accordance with the temperature and the luminosity also increases. In contrast, in a case where the voltage adjustment by the voltage adjuster 22 is performed, the forward current If of the LED of the light emitter 13 is stabilized and thus the brightness of the LED is maintained at a constant luminosity Li.

Such an exemplary embodiment achieves the following effects.

In the illuminator 1 of the exemplary embodiment, the drive voltage being supplied from the illumination controller 20 to the light emitter 13 is adjusted on the basis of the current temperature of the light emitter 13 detected by the temperature sensor 15. This stabilizes the current flowing through the light emitter 13 irrespective of a change in temperature of the light emitter 13 to stabilize the brightness of the light emitter 13. By virtue of such temperature feedback, an illuminance of the illuminator 1 of the exemplary embodiment can be stabilized.

In the illuminator 1 of the exemplary embodiment, a temperature-based current stabilization control as described above can be easily achieved by adding the temperature sensor 15 to the equipment body 10 and changing control software (the illumination controller 20) of the control device 3. The illuminance of the illuminator 1 can thus be stabilized with a simplified structure.

In the illuminator 1 of the exemplary embodiment, the reference temperature is stored in advance in the reference temperature storage 23 of the illumination controller 20 and the reference temperature and the current temperature from the temperature sensor 15 are compared by the voltage adjuster 22 to adjust the drive voltage of the driver circuit 21. Thus, the drive voltage can be easily adjusted in accordance with the current temperature of the light emitter 13 by virtue of the comparison with the reference temperature stored in advance, by the illumination controller 20 and the illuminance of the illuminator 1 can be stabilized with a simplified structure.

In the illuminator 1 of the exemplary embodiment, the illumination controller 20 detects the current temperature from the temperature sensor 15 on a constant time cycle and adjusts the drive voltage of the driver circuit 21. This allows the process (Steps S2 to S9 in FIG. 3) by the voltage adjuster 22 to be a process on the constant time cycle. Thus, it is possible to avoid an excessively frequent adjustment operation and keep pace with a change in temperature of the light emitter 13 with a load of the process being reduced.

In the illuminator 1 of the exemplary embodiment, the temperature sensor 15 is attached to the heat sink 14 fixed to the light emitter 13. This makes it possible to detect the current temperature of the light emitter 13 through the heat sink 14 for voltage adjustment by the temperature feedback.

It should be noted that the invention is not limited to the above-described exemplary embodiment and modifications and the like are within the scope of the invention as long as an object of the invention is achievable.

In the above-described exemplary embodiment, the illuminator 1 attachable to the vision measuring system 2 is described by way of example; however, the invention is applicable as an illuminator for a microscope, a projector, an in-line inspection system or the like. In addition, the illuminator 1 for white-light epi-illumination is not limiting and the invention is also applicable to colored-light ring illumination.

Figure 5:
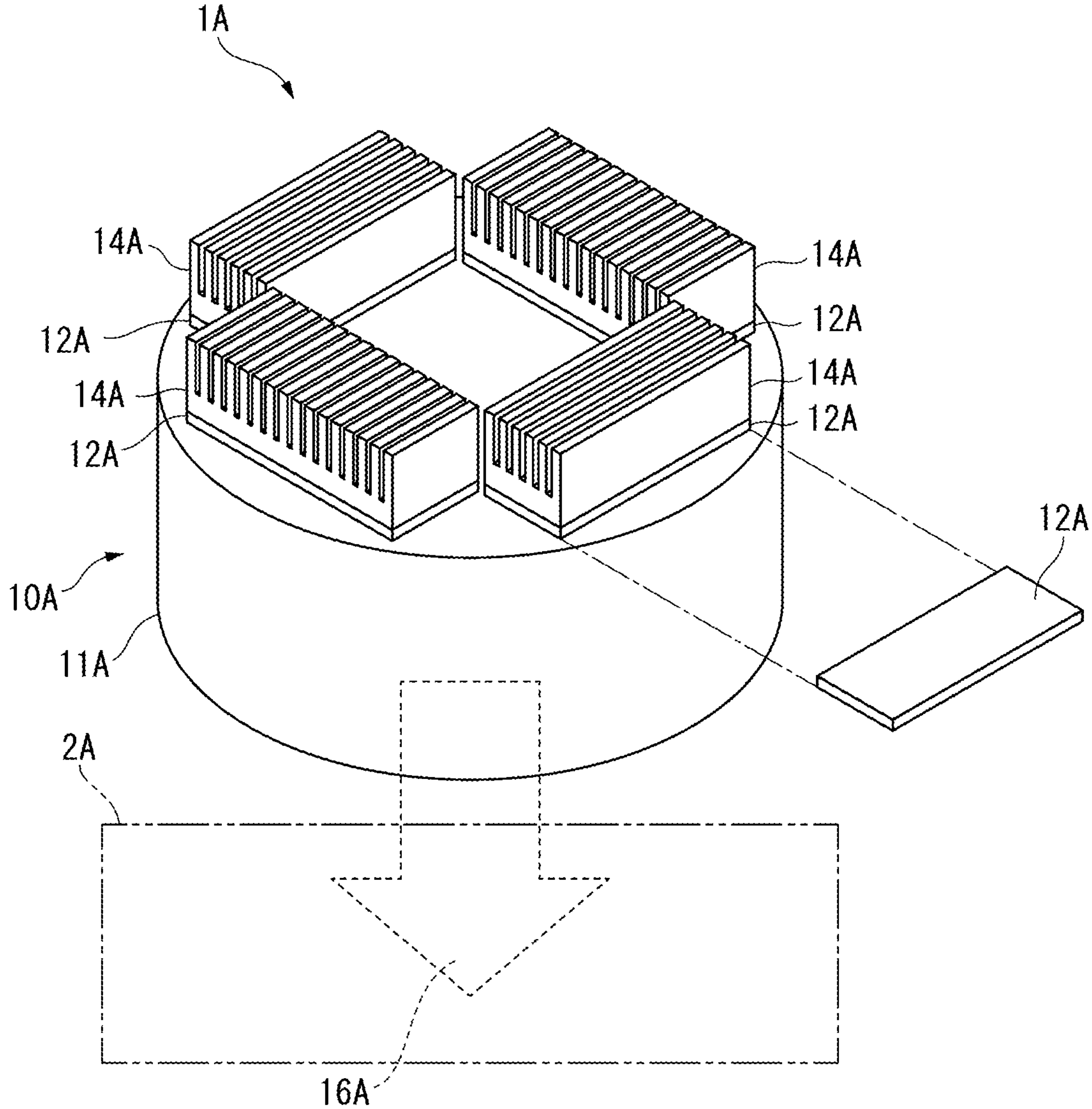
FIG. 5 is a schematic diagram illustrating an illuminator of another exemplary embodiment of the invention.
Figure 6:
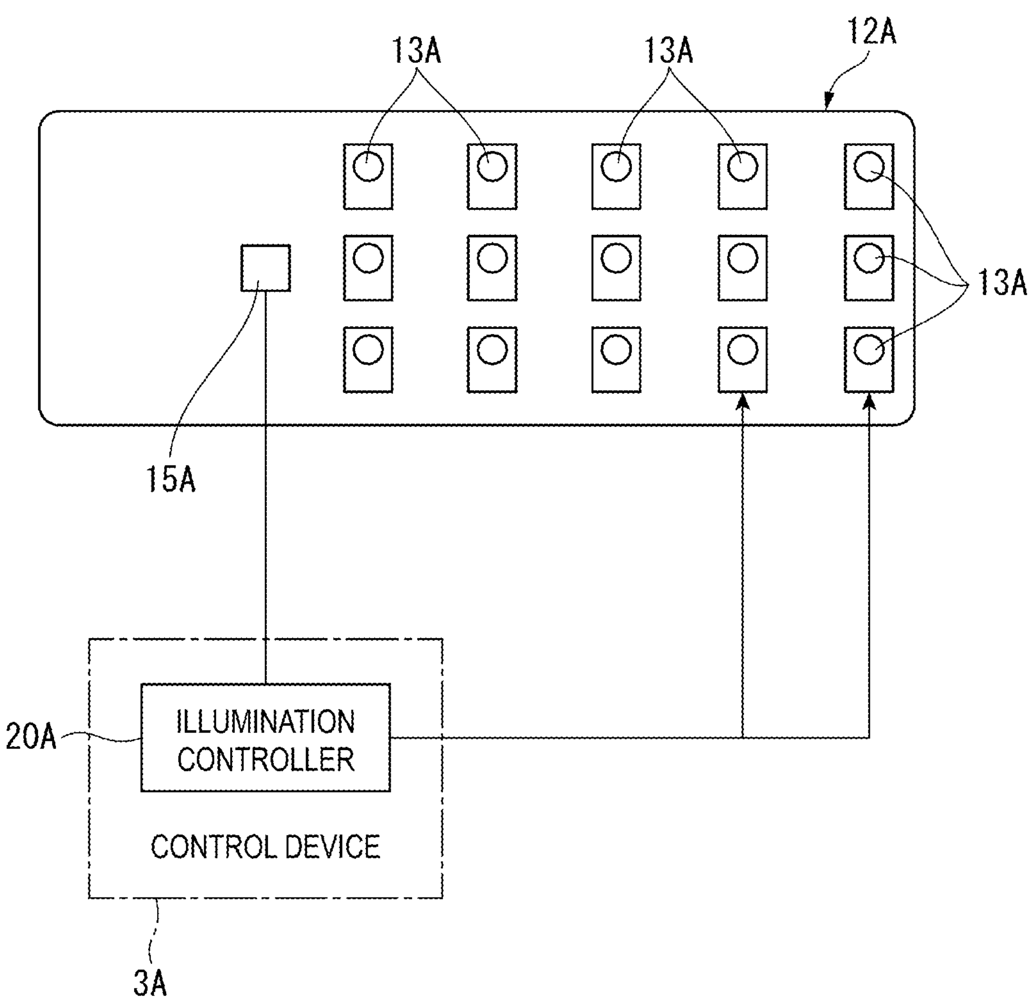
FIG. 6 is a schematic diagram illustrating a circuit board and an illumination controller of the other exemplary embodiment.

FIG. 5 and FIG. 6 illustrate another exemplary embodiment of the invention.

In FIG. 5, an illuminator 1A, which is attachable to a vision measuring system 2A to supply colored illumination light 16A, includes an equipment body 10A and an illumination controller 20A installable in a control device 3A of the vision measuring system 2A.

The illuminator 1A includes four circuit boards 12A at an upper outer periphery of a case 11A. The circuit boards 12A each have an upper surface covered by a heat sink 14A.

In FIG. 6, a plurality of light emitters 13A, each of which includes a light-emitting diode (LED) as a light source, are fixed to each of the circuit boards 12A.

The circuit boards 12A each include a single temperature sensor 15A located at a portion adjacent to a section where the plurality of light emitters 13A are arranged.

The temperature sensor 15A indirectly detects current temperatures of the plurality of light emitters 13A by detecting a temperature of the circuit board 12A.

The illumination controller 20A controls drive states of the light emitters 13A on the basis of the current temperatures of the light emitters 13A detected by the temperature sensor 15A.

The illumination controller 20A has a configuration similar to that of the above-described exemplary embodiment (see FIG. 2) and a duplicating description thereof is omitted. Incidentally, the driver circuit 21 in FIG. 2 causes three separate systems based on RGB colors to be driven in the exemplary embodiment.

In the exemplary embodiment in FIG. 5 and FIG. 6, the drive voltage is likewise easily adjustable in accordance with the current temperatures of the light emitters 13A by virtue of an operation similar to that of the above-described exemplary embodiment in FIG. 1 to FIG. 4 and an illuminance of the illuminator 1A can be stabilized with a simplified structure.

Further, in the illuminator 1A of the exemplary embodiment, the temperature sensor 15A is attached to each of the circuit boards 12A to which the light emitters 13A are fixed. This makes it possible to comprehensively detect the temperatures of the plurality of light emitters 13A arranged on the circuit board 12A.

In the above-described exemplary embodiment, the current temperature detected by the temperature sensor 15 when the illuminator 1 is activated is used as the reference temperature that is to be compared with the current temperature; however, room temperature or any other temperature may be designated. In addition, regarding the reference temperature, a default value in the reference temperature storage 23 may be continuously used or the reference temperature stored in the reference temperature storage 23 may be updated with a new current temperature every time when the drive voltage is adjusted by the voltage adjuster 22. In this case, the voltage adjuster 22 compares a temperature at the previous voltage adjustment with the current temperature.

What is claimed is:

1. An illuminator comprising:

a light emitter comprising a light-emitting diode;

a temperature sensor configured to detect a current temperature of the light emitter;

and an illumination controller configured to adjust a drive voltage being supplied to the light emitter in accordance with the current temperature such that a brightness of the light emitter is constant, wherein the illumination controller is further configured to adjust the drive voltage being supplied to the light emitter by a predetermined ratio, the illumination controller has a reference temperature stored therein in advance, the illumination controller being configured to compare the current temperature and the reference temperature to adjust the drive voltage, and the reference temperature is updated with a new current temperature every time the drive voltage is adjusted.

2. The illuminator according to claim 1, wherein the illumination controller is configured to detect the current temperature from the temperature sensor on a constant time cycle and adjust the drive voltage.

3. The illuminator according to claim 1, wherein the temperature sensor is attached to a heat sink fixed to the light emitter or a circuit board to which the light emitter is fixed.

* * * * *